United States Patent [19]

Schauer

[11] Patent Number: 4,836,795

[45] Date of Patent: Jun. 6, 1989

[54] APPARATUS FOR PROVIDING AN ELECTRICAL CONDUCTION PATH BETWEEN TWO CONTACT LOCATIONS

[75] Inventor: Friedrich Schauer, Haroldsberg, Fed. Rep. of Germany

[73] Assignee: Kabelmetal Electro GmbH, Hanover, Fed. Rep. of Germany

[21] Appl. No.: 244,869

[22] Filed: Sep. 15, 1988

[30] Foreign Application Priority Data

Sep. 24, 1987 [DE] Fed. Rep. of Germany ....... 3732124

[51] Int. Cl.⁴ ..................... H01R 35/00; H02G 11/06; B60R 21/22
[52] U.S. Cl. .................................. 439/164; 280/731; 439/15
[58] Field of Search ................. 174/21 JC, 21 JR, 86, 174/69; 439/1, 11, 13, 15, 16, 164; 280/731

[56] References Cited

U.S. PATENT DOCUMENTS 4,696,523 9/1987 Schauer et al. ...................... 439/11

FOREIGN PATENT DOCUMENTS 518098 2/1940 United Kingdom ................ 439/164
2164506 3/1986 United Kingdom .................. 439/13

Primary Examiner—Laramie E. Askin
Attorney, Agent, or Firm—James C. Jangarathis

[57] ABSTRACT

Apparatus for providing an electrical conduction path between a first contact location rotatable a plurality of rotations, in either direction, about a longitudinal axis, and a stationary contact location positioned radially from the rotatable contact location. Such apparatus is comprised of a bifilar spiral spring formed of a length of ribbon cable having at least two electrical conductors. The bifilar spiral coil spring is secured only by connections at its opposite ends to the two contact locations; whereby it uncoils and slidably moves in response to the direction of rotation of the rotatable contact location, and upon reversal of such rotation, recovers its original shape and position between the two contact locations.

5 Claims, 2 Drawing Sheets

APPARATUS FOR PROVIDING AN ELECTRICAL CONDUCTION PATH BETWEEN TWO CONTACT LOCATIONS

The invention relates to apparatus for maintaining an electrical conduction path between a contact location rotatable a plurality of rotations, in either direction, about a longitudinal axis, and a stationary contact location positioned radially from the rotatable contact location.

BACKGROUND OF THE INVENTION

It is priorly known to provide a conduction path between two contact locations of which one is movable on a circular path, while the other is disposed stationary outside such circular path. Such conduction paths have been used in the circuitry of impact protection mechanisms including safety impact bags stored in the steering columns of motor vehicles. Upon serious impact of any such motor vehicle, there is the requirement that the safety impact bag be instantaneously expelled from the steering column and inflated by the provision of high pressure gas. Each of such mechanisms has included a source of high pressure gas coupled to the safety impact bag, and an igniter circuit that activated such source in response to control signals from an on-board vehicle computer. The transmission of such control signals required a conduction path between the aforesaid stationary contact location and the rotatable contact location mounted in the steering wheel, the latter of which required an ability to be rotated up to six revolutions with the steering wheel.

In the prior mechanisms such conductive path comprised a coiled spring formed of a metal band positioned about the rotatable contact location. Upon the rotation of the rotatable contact location in one direction, the windings of such coiled spring were pulled together to reduce the diameter of the spring; while rotation in the opposite direction caused the windings of such coiled spring to expand and increase the diameter of the spring. Accordingly, the relative movement of the two contact locations connected by such coiled spring resulted in a "breathing" motion, similar to a watch spring. To enable the rotatable contact location to rotate at least six revolutions, the coiled spring of the prior art required a large number of windings and, consequently, the metal band of which it was comprised had an extensive length. As the electrical resistance of the metal band was directly proportional to its length, such length was an impediment to the transmission of the control signals to the igniter circuit.

OBJECTS OF THE INVENTION

An object of the present invention is to provide a novel apparatus for maintaining a conductive path between a contact location rotatable a plurality of rotations, in either direction, about a longitudinal axis, and a stationary second contact location positioned radially from such contact location.

Another object of the present invention is to provide such a novel apparatus which employs a bifilar spiral coil spring connected between the two contact locations.

A further object of the present invention is to provide a low resistance conductive path between such two contact locations, to facilitate the transmission of low power, control signals therethrough.

A still further object of the present invention is to provide a conduction path of reduced length between such contact locations, while permitting the rotatable contact location to rotate up to at least six full revolutions.

SUMMARY OF THE INVENTION

These and other objects of the present invention are achieved by an apparatus comprising a bifilar spiral coil spring formed of a length of ribbon cable having at least two electrical conductors, and having a portion thereof bent over, at a reversing location, onto the remaining portion. Such ribbon cable is configured as a spiral coil spring with the reversing location at its center. Further, the bifilar spiral coil spring is secured only by connections at one end of the ribbon cable to the stationary contact location, and at the other end of the ribbon cable to the rotatable contact location, whereby it uncoils and slidably moves in response to the direction of rotation of the rotatable contact location; and upon reversal of such rotation, recovers its original shape and position between the two contact locations.

BRIEF DESCRIPTION OF THE DRAWINGS

A better understanding of the present invention as well as the objects and advantages thereof will become apparent upon consideration of the following disclosure thereof, especially when taken with the accompanying drawings, wherein:

Referring to FIG. 1, there is depicted a steering mechanism comprised of a steering column 1 with a steering wheel 2 mounted thereon. Further, there is extending from a hub 3 of the steering wheel 2 a safety impact bag 4 depicted in its expanded condition. The safety impact bag 4 in its unexpanded, folded condition would be positioned in the steering column 1 with, for example, an apparatus in accordance with the instant invention for maintaining a conduction path for signals that control an igniter circuit that activates a gas discharge source (not shown) for expanding the safety impact bag 4.

Figure 2:
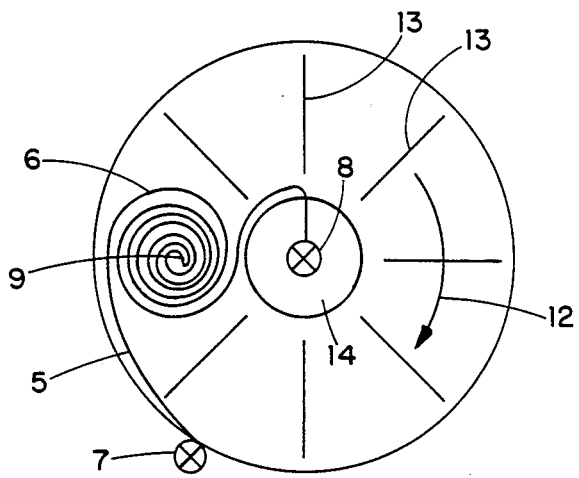
FIG. 2 is a plan view of an apparatus in accordance with the instant invention for maintaining an electrical conduction path between a contact location rotatable a plurality of rotations, in either direction, about a longitudinal axis of the steering wheel of FIG. 1, and a contact location fixedly positioned radially from the rotatable contact location.
Figure 3:
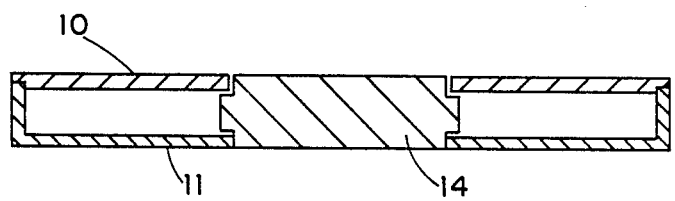
FIG. 3 is a side sectional view of the apparatus of FIG. 2.

With regard to FIGS. 2 and 3, there is depicted an apparatus for maintaining a conduction path between a contact location 8 rotatable about the longitudinal axis of the steering column 1, and a stationary contact location 7 radially positioned from the rotatable contact location 8. Such apparatus includes a bifilar spiral coil spring 6 formed of a length of flat ribbon cable 5 of a priorly known type, including at least two electrical conductors (not shown). In particular, the ribbon cable 5 is configured so as to have one portion thereof bent over, at a reversing location 9, onto the remaining portion thereof, and thereafter being formed as a bifilar spiral coil spring 6 with the reversing location 9 as its center. Each of the ends of the ribbon cable 5 forming the bifilar spiral coil spring 6, is connected to one of the contact locations 7 and 8. The bifilar spiral coil spring 6 is secured only by such connections between the stationary contact location 7 and the rotatable contact location 8. Further, each of the two portions of the ribbon cable 5 divided at the reversing location 9 is of a length sufficiently greater than the distance between the stationary contact location 7 and the rotatable contact location 8, such that the bifilar spiral coil spring 6 has a diameter in its original shape and position (as depicted in FIG. 2) at most identical with the shortest distance between the contact locations 7 and 8, and only partially uncoils, as hereinafter described, upon a plurality of rotations of the contact location 8.

The bifilar spiral coil spring 6 is positioned in a plane including the stationary contact location 7 and the rotatable contact location 8. Further, the bifilar spiral coil spring 6 is positioned between a flat plate 10 and a flat plate 11 positioned parallel to each other and to such plane of the bifilar spiral coil spring 6. The distances between the inner surfaces of the flat plates 10 and 11, and the two side edges of the bifilar spiral coil spring 6 are such as to restrain transverse movement of any segment of the bifilar spiral coil spring 6, while permitting the bifilar spiral coil spring 6 to slidably move about rotatable contact location 8. Flat plates 10 and 11 include on their inner surfaces protruding ribs 13 which extend in radial directions and serve the purpose of reducing frictional forces between the side edges of the sliding bifilar spiral coil spring 6 and the flat plates 10 and 11. The flat plates 10 and 11 are configured as plate rings with central apertures between which extends a support member 14. The support member 14 also has a central aperture (not shown) that is positioned about the rotatable contact location 8. As depicted in FIG. 2, one end of the ribbon cable 5 is connected to the rotatable contact location 8 through a radial slot in the support member 14.

Figure 1:
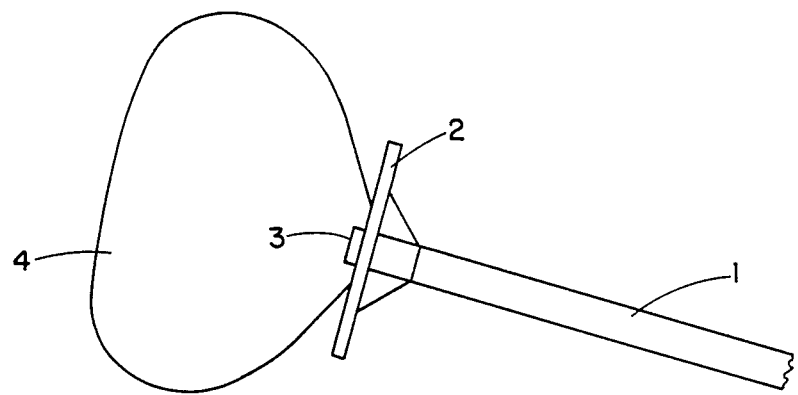
FIG. 1 is a schematic view of a steering wheel of a motor vehicle with a safety impact bag in its expanded condition.

An understanding of the operation of the apparatus of the instant invention will be facilitated by the following description:

FIG. 2 depicts the position of the bifilar spiral coil spring 6 during a straight-ahead condition of the steering mechanism of FIG. 1. Upon the rotation of the steering wheel 2 in the direction of arrow 12, the contact location 8 rotates about the longitudinal axis of the steering column 1. Such rotation causes the portion of the ribbon cable 5 connected to contact location 8, through the support member 14, to be pulled in the general direction of rotation. Since such pulled portion is one end of the bifilar spiral coil spring 6, such spring partially uncoils, causing a reduction in its diameter while it slides within the flat plates 10 and 11, in the general direction of rotation. Additionally, the movement of the bifilar spiral coil spring 6 causes the portion of the ribbon cable 5 connected to the stationary contact location 7 to uncoil from the bifilar spiral coil spring 6.

Figure 4:
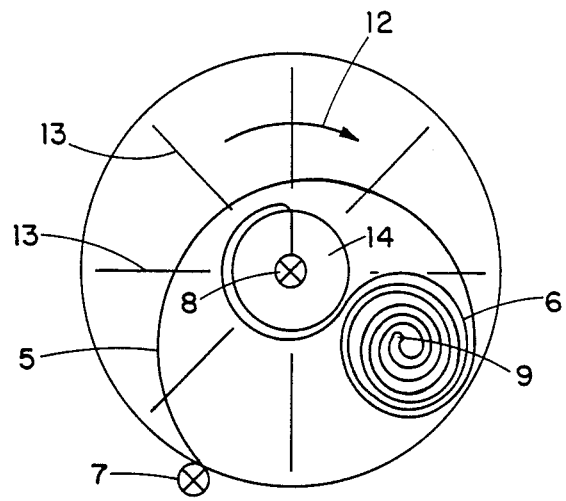
FIG. 4 is a plan view of the apparatus of FIG. 2, rotated in the direction of the arrow 12, one complete rotation from the condition depicted in FIG. 2.

FIG. 4 illustrates the position of the coiled portion of the bifilar spiral coil spring 6 after one full rotation of the steering wheel 2, as contrasted with the position thereof illustrated in FIG. 2. The pulling forces applied at both ends of the bifilar spiral coil spring 6 at the rotatable contact location 8 and stationary contact location 7 have caused the bifilar spiral coil spring 6 to partially uncoil and move approximately 210 degrees from its original position.

Figure 5:
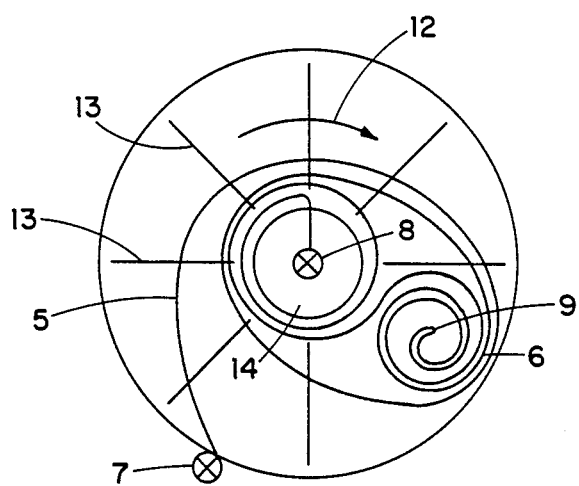
FIG. 5 is a plan view of the apparatus of FIG. 2, rotated in the direction of the arrow 12, six complete rotations from the condition depicted in FIG. 2.

FIG. 5 illustrates the position of the coiled portion of the bifilar spiral coil spring 6 after six full rotations of the steering wheel 2, and associated six full rotations of the rotatable contact location 8. As a consequence of such rotations, the end of bifilar spiral coil spring 6 connected to the stationary contact location 7 uncoils from the bifilar spiral coil spring 6 and extends about both the contact location 8 and the uncoiled portion of the bifilar spiral coil spring 6 a full revolution and more; while the other end of the bifilar spiral coil spring 6 connected to the rotatable contact location 8 uncoils and extends about the rotatable contact location 8 a full revolution and more. Even after six rotations of the steering wheel 2, and the associated six rotations of the rotatable contact location 8, the remaining coiled portion of the bifilar spiral coil spring 6, as depicted in FIG. 5, includes a plurality of windings sufficient to assure a recoiling of the bifilar spiral coil spring 6 once the steering wheel 2 is rotated in a direction opposite to that of arrow 12. After six rotations of the steering wheel 2 in such opposite direction, the bifilar spiral coil spring 6 assumes the coiled condition and position illustrated in FIG. 2. Further rotation of the steering wheel 2 in such opposite direction causes the bifilar spiral coil spring 6 to move in a similar manner but in the opposite direction.

In order to assure that each end portion of the ribbon cable 5 of the bifilar spiral coil spring 6 is not damaged by repetitive sharp bending in the vicinity of the contact location 7 or 8, such end portion is embedded in a bending protection media (not shown).

While the invention has been described in connection with an exemplary embodiment thereof, it will be understood that many modifications will be apparent to those of ordinary skill in the art and that this application is intended to cover any adaption or variations thereof. Therefore, it is manifestly intended that the invention be only limited by the claims and equivalents thereof.

What is claimed:

1. Apparatus for providing an electrical conduction path between a first contact location rotatable a plurality of rotations in either direction, about a longitudinal axis, and a stationay second contact location positioned radially from said first contact location, comprising:
a bifilar spiral coil spring formed of a length of a ribbon cable having at least two electrical conductors, said ribbon cable having a first portion thereof bent over, at a reversing location, onto the remaining portion thereof; said portions of said ribbon cable being of lengths greater than the distance between said first contact location and said second contact location, and being formed as a bifilar spiral coil spring with said reversing location at its center; said bifilar spiral coil spring being secured only by a first connection at one end of said ribbon cable to said first contact location, and a second connection at the other end of said ribbon cable to said second contact location;
whereby, upon rotation of said first contact location through a plurality of rotations in either direction, said bifilar spiral coil spring partially uncoils and slidably moves in the direction of rotation, and upon reversal of said rotation recovers its original shape and position.

2. An apparatus in accordance with claim 1, wherein said bifilar spiral coil spring is positioned in a plane including said first contact location and said second contact location; and further comprising a first flat plate and a second flat plate positioned parallel to each other and to said plane of said bifilar spiral coil spring; said bifilar spiral coil spring being positioned between, and having its transverse movement confined by, said first and second flat plates.

3. Apparatus in accordance with claim 2, wherein said first and second flat plates are configured as first and second plate rings each with a central aperture; and further comprising a ring-shaped support member extending between said first and second plate rings and through said central apertures.

4. Apparatus in accordance with claim 2, wherein the surface of said first flat plate, and the surface of said second flat plate, adjacent to said bifilar spiral coil spring include protruding ribs extending in a radial direction.

5. Apparatus for providing an electrical conduction path between a first contact location rotatable a plurality of rotations, in either direction, about a longitudinal axis, and a stationary second contact location positioned radially from said first contact location, comprising:

a bifilar spiral coil spring formed of a length of a ribbon cable having at least two electrical conductors, said ribbon cable having a first portion thereof bent over, at a reversing location, onto the remaining portion thereof; said portions of said ribbon cable being of lengths greater than the distance between said first contact location and said second contact location, and being formed as a bifilar spiral coil spring with said reversing location at its center; said bifilar spiral coil spring being secured only by a first connection at one end of said ribbon cable to said first contact location, and a second connection at the other end of said ribbon cable to said second contact location; said bifilar spiral coil spring having a diameter in its original shape and position at most identical with the shortest distance between said first contact location and said second contact location; whereby, upon rotation of said first contact location through a plurality of rotations in either direction, said bifilar spiral coil spring partially uncoils and slidably moves in the direction of rotation, and upon reversal of said rotation recovers its original shape and position.

* * * * *